United States Patent [19]

Jadach

[11] 4,275,285

[45] Jun. 23, 1981

[54] METHOD OF WELDING CAPPED WHEEL NUT

[75] Inventor: Albert A. Jadach, Royal Oak, Mich.

[73] Assignee: Towne Robinson Fastener Company, Southfield, Mich.

[21] Appl. No.: 60,325

[22] Filed: Jul. 25, 1979

Related U.S. Application Data

[63] Continuation of Ser. No. 876,920, Feb. 10, 1978, abandoned.

[51] Int. Cl.³ .................... B23K 11/14; B21D 53/24; F16B 37/14
[52] U.S. Cl. .................................. 219/93; 219/86.1; 10/86 C; 411/430
[58] Field of Search .................... 219/78.01, 86.1, 87, 219/92, 93, 86.9; 10/86 C; 85/32 WE, 35, 9 W

[56] References Cited

U.S. PATENT DOCUMENTS

| 928,701 | 7/1909 | Rietzel | 219/93 |
| 2,137,909 | 11/1938 | Hagedorn | 219/86.9 |
| 3,076,086 | 1/1963 | Adams | 219/86.1 X |
| 3,272,960 | 9/1966 | Smith | 219/91.21 X |
| 3,781,981 | 1/1974 | Miura et al. | 219/87 X |
| 3,946,190 | 3/1976 | Hascoe | 219/86.9 |

| 4,056,862 | 11/1977 | Chaivre et al. | 219/86.1 X |

FOREIGN PATENT DOCUMENTS 713343 10/1941 Fed. Rep. of Germany ............. 219/92

Primary Examiner—Arthur T. Grimley
Assistant Examiner—Keith E. George
Attorney, Agent, or Firm—Krass, Young & Schivley

[57] ABSTRACT

A steel nut body has its wrench flats covered by a sheet stainless steel sheath that extends over one of the nut ends to form a cap. The surfaces of the wrench flats are formed with ridges that bear against the inner surfaces of the sheath. The sheath is welded to the nut to resist forces exerted during torquing by bringing a pair of electrodes into pressured contact with the sheath on opposed sides of the nut to produce pressure concentrations at the ridges. An extremely short, high current electrical pulse is then passed between the electrodes. The heating produced by the current at the interface between the sheath and the nut body decreases the electrical resistance of this path resulting in primary current flow path between the two interfaces, through the nut body, to produce resistance welds at the inner faces without substantially modifying the metallurgy of the sheath.

25 Claims, 6 Drawing Figures

METHOD OF WELDING CAPPED WHEEL NUT

This is a continuation of application Ser. No. 876,920, filed Feb. 10, 1978, now abandoned.

BACKGROUND OF THE INVENTION

1. Field of the Invention

This invention relates to a method of welding a sheet steel sheath to a nut body to form a capped wheel nut.

2. Prior Art

Nuts for retaining the wheels of automobiles and other vehicles to the axles are often formed with caps that extend over the end of the nut opposite to the wheel engaging end. These caps serve the functional purpose of preventing exposure of the wheel studs to minimize corrosion or damage that might be caused by impacts, as well as the aesthetic purpose of providing a decorative appearance to the wheel. U.S. Pat. No. 3,364,806 assigned to the assignee of the present invention, discloses a form of capped wheel nut that has enjoyed substantial commercial success. Broadly it employs an ordinary sheet nut body having the wrench flats covered by a sheath of sheet stainless steel. The sheath extends over the end of the nut opposite to the wheel engaging cone and terminates at a land formed between the cone and the adjacent end of the wrench flats.

Repeated applications of wrenching forces to capped nuts of this type may tend to loosen the engagement between the sheath and the nut body causing rattling or complete loss of nut sheath. It has been proposed that the sheath be welded to the nut bodies to eliminate rattling and U.S. Pat. No. 4,123,961 assigned to the assignee of the present invention, discloses a method of welding these nuts involving contacting the exposed conical nut end and the sheath with electrodes, and passing an extremely short duration, high current pulse between the electrodes.

In welding the sheaths to the nut bodies care must be taken to insure that the stainless steel of the sheath is not subjected to temperatures which will adversely affect its coloration or corrosion resistance. If the sheath is exposed to conventional welding temperatures for conventional periods of time, carbon migration will occur and will substantially lower the steel's corrosion resistance resulting in discoloration during use. The welds must also be positioned between the sheath and the body in such a manner that the torquing forces exerted on the weld during wrenching of the nut is not likely to result in rupture of the sheath.

SUMMARY OF THE INVENTION

The present invention is broadly directed toward a method of forming capped wheel nuts having the sheath welded to the nut body by contacting separated points on the outer surface of the sheath with electrodes and causing a welding current flow through the interfaces between the sheath and the nut body adjacent to the areas contacted by the electrodes, and through the nut body. This method is thus performed without the necessity of contacting the nut body with an electrode. The method allows the convenient use of automatic machinery for supporting the nuts and forming the welds and allows welds to be formed in capped nuts wherein it is not practical to contact the nut body with the welding electrode. The welds produced by the present invention are strong and uniform and do not produce any deleterious effects on the stainless steel sheet.

In the method of the present invention a pair of welding electrodes are brought into contact with the outer sides of the sheath at areas covering diametrically opposed wrench flats. The electrodes produce high-pressure concentrations between the inner surfaces of the sheath, immediately adjacent or below the electrodes, and the contacted surfaces of the wrench flats. A high current density, short duration electric pulse is then passed between the electrodes. Preferably the pulse duration will be less than about 30 microseconds and the current amplitude will exceed 50,000 amperes.

The electrical path between the electrodes may be viewed as two parallel paths, one through the sheath itself, in the plane of the sheath, and the other through the thickness of the sheath beneath each of the electrodes, through the two interfaces between the inner surfaces of the sheath at those points and the wrench flats, and through the nut body between these interfaces. The resistance of the second path may be increased if the nut body is coated with a corrosion-resistant coating such as a phosphate or a dichromate salt. The electrical path through the nut body between areas of the sheath other than those directly beneath the electrodes may be disregarded because of its relatively high resistance, whether the nut body is coated or uncoated.

While the resistance of the electrical path through the interfaces and the nut body may be higher than the resistance of the path through the sheath when measured before the welding pulse is applied, the heating that takes place at the interfaces between the sheath and the nut body below the electrodes, during the initial few microseconds of the current pulse, breaks down the resistance of these interfaces to produce a primary current flow through the interfaces in the nut body rather than through the sheath path. This results in welding occurring between the sheath and the nut body below the electrodes.

To enhance the welding action the nut body is preferably formed with ridges which project outwardly from the wrench flat faces and make contact with the inner surfaces of the sheath along thin lines as a result of the pressures applied by the welding electrodes.

When the welding current is applied this results in a large ratio between the area of the nuts contacted by the electrode and the contact area between the inner surfaces of the sheath and the ridges, where welding is desired. The high heat that is generated at this small contact area by the initial current flow causes a lowering of the resistance of the path so that the primary path of current flow is through the ridges rather than along the surface of the sheath between the two electrodes.

Other objectives, advantages and applications of the invention will be made apparent by the following detailed description of the preferred embodiment of the invention.

Figure 1:
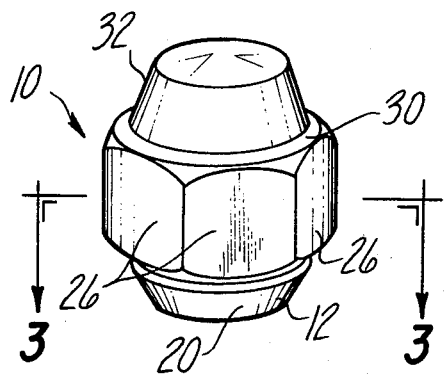
FIG. 1 is a perspective view of a wheel nut formed by the method of the present invention.
Figure 2:
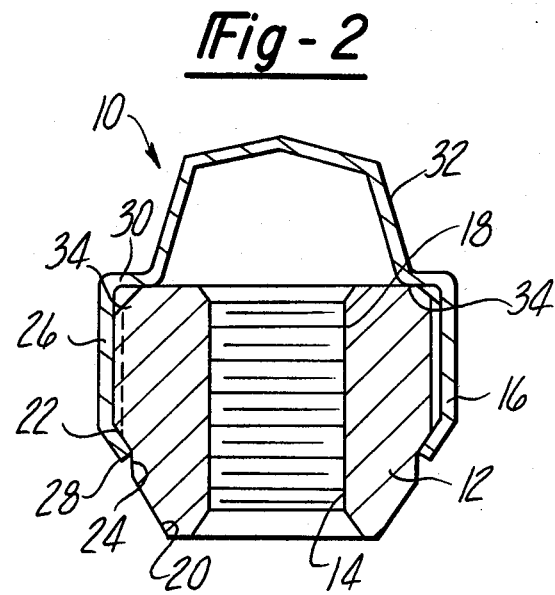
FIG. 2 is a sectional view of the nut, of FIG. 1, taken along line 2—2 of FIG. 3.
Figure 3:
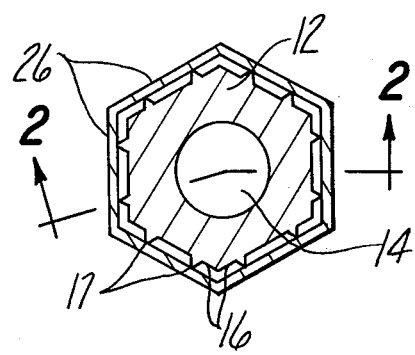
FIG. 3 is a sectional view of the nut, of FIG. 1, taken along line 3—3 of FIG. 1.
Figure 6:
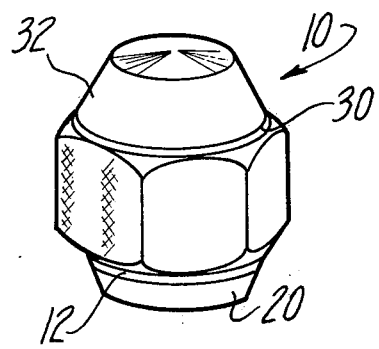
FIG. 6 is a perspective view of the completed nut assembly.
Figure 4:
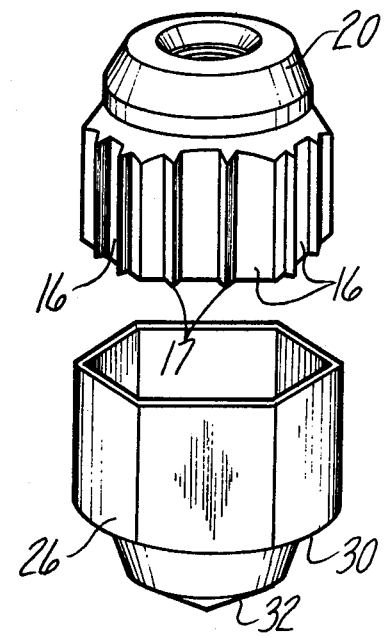
FIG. 4 is an exploded inverted perspective view of the nut of FIG. 1.

The capped wheel nut illustrated in FIGS. 1, 2, 3 and 4 generally indicated at 10, has a configuration generally resembling the nut of U.S. Pat. No. 3,364,806. The nut body or insert 12, has a central threaded aperture 14 and hexagonal wrench flats 16 arranged parallel to the axis of the aperture. One end of the nut 18 is generally flat and the other end of the nut is formed with a conical surface 20 that is adapted to mate with the conical depressions typically formed around the stud holes in a conventional automotive wheel. The ends of the wrench flats 16 adjacent to the conical end 20 are formed with a laterally inwardly directed chamfer or shoulder 22 to meet a short cylindrical land 24 which connects with the conical end 20. The land 24 may have a diameter approximating the width of the nut body between a pair of opposed wrench flats 16 so that the chamfer or shoulder 22 extends only adjacent the corners of the flats.

The nut body 12 may be coated with a corrosion-resistant material, a phosphate or dichromate salt solution or the like. The nut body 12 is covered by a sheath or cap formed of sheet metal, preferably stainless steel. The cap has sections 26 which extend over the wrench flats 16 and are crimped over the chamfer 22, to terminate adjacent the cylindrical land 24. This arrangement, claimed in U.S. Pat. No. 3,364,806, provides a neat termination for the free edge 28 of the sheath, formed so the edge will not interfere with the secure joinder of the nut to the conical wheel depression, and the forces exerted between the nut and the wheel will not tend to loosen the cap from the nut body.

Formed on and integrally with the wrench flats 16 are a plurality of ridges 17 running parallel to the main axis of the nut that contact the inside of the cap sections 26 when the cap is placed over the nut. The preferred embodiment shows two of these ridges on each face, however, in alternative embodiments of the invention different ridge geometrics may be employed. The ridges of the preferred embodiment have sharp edges; ridges with flat or rounded edges may be used alternatively. The ridges can be formed with the nut in suitable cold heading apparatus.

The capped wheel nut as heretofore described is substantially the same as the nut described in U.S. Pat. No. 3,364,806, with the exception of the ridges 17 on the wrench flats 16. The present invention is also applicable to nuts which do not employ sheaths having crimped edge 28 but rather terminating along the wrench flats of the nut or adjacent the end of the wrench flats. The welding arrangement which will subsequently be described securely retains the sheaths to the nut body without the need for crimping. These alternate forms of the invention include wheel nuts having conical ends as well as conventional nuts.

In the present capped nut 10, the contacting surfaces of the wrench flat ridges 17 and the cap sections 26 are projection welded together, forming a narrow line weld at each ridge. These welds securely retain the cap to the nut body 12 so that their engagement does not depend upon the crimping of the free end 28 of the cap around the chamfered section 22 of the nut body. This welded joinder securely retains the nut against the forces that tend to dislodge the cap from the body during wrenching of the nut, and impact forces experienced while the nut is in service. As will be subsequently described, the weld is formed in such a manner as to leave the finish and metallurgy of the sheet metal cap substantially unimpaired.

Figure 5:
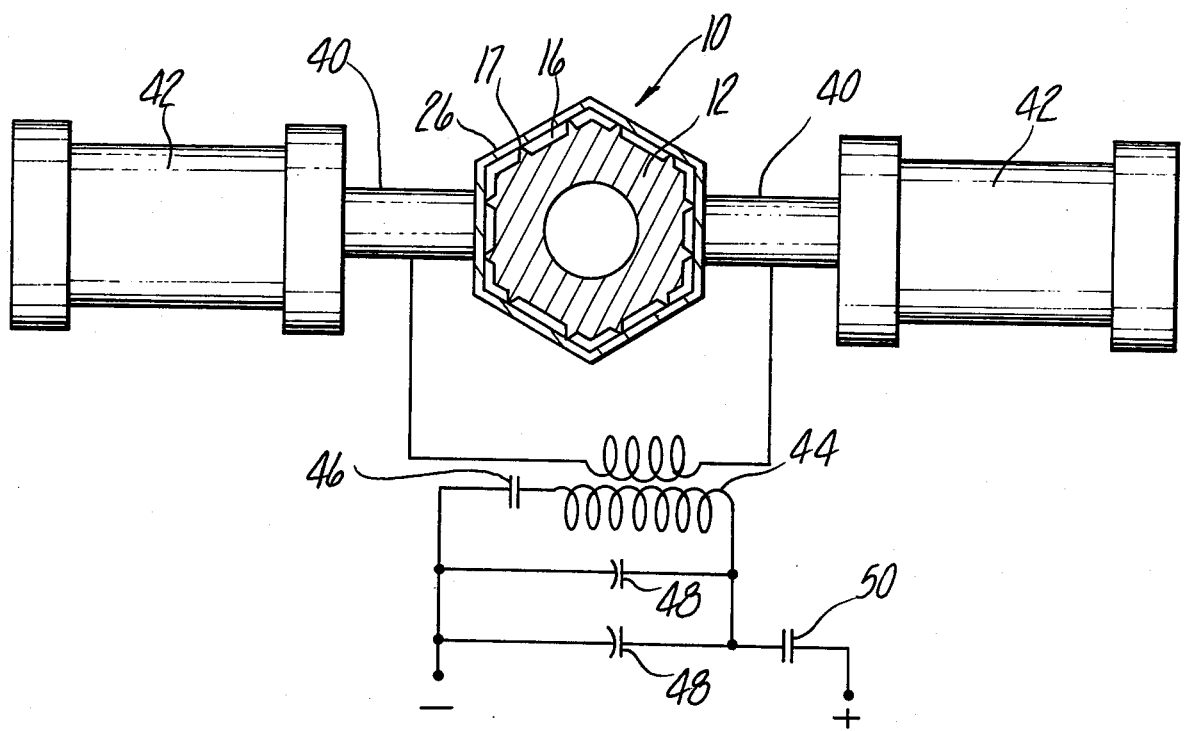
FIG. 5 is a cross-sectional view through an assembly of a nut body and sheath with welding electrodes in place with a preferred embodiment of the welding circuit schematically illustrated.

Welding of the caps to nut bodies, in accordance with the method of the present invention, is preferably performed in apparatus of the type illustrated in FIG. 5.

The apparatus of FIG. 5 operates upon an assembly, generally indicated at 10, of a nut body 12 and a stainless steel sheath. The body and sheath are shown in exploded relationship, prior to assembly, in FIG. 4. The assembly may have the free edge of the sheath crimped over chamfer 22 of the nut body or the crimping operation alternatively may be performed subsequent to the welding operation.

For the purpose of welding, the assembly 10 is supported in a suitable fixture of conventional design (not shown). A pair of welding electrodes 40 are brought into pressured contact with a pair of sheath sections 26 disposed on diametrically opposed sides of the nut body 12. The electrodes 40 are illustrated as being actuated by a pair of fluid cylinders 42 but other conventional forms of actuating arrangements may be used.

The two electrodes 40 are connected to the opposite output terminals of a capacitor discharge power supply diagrammatically illustrated in FIG. 5. The power supply employs a transformer having the two ends of its secondary winding connected to the two electrodes 40. The primary of the transformer 44 is connected in series with a contactor 46 across a bank of relatively large electrolytic capacitors 48. The capacitors may be connected to a direct current charging source by a second contactor 50.

In operation, the contacts 46 are open and the contacts 50 are closed, connecting the capacitors 48 to the charging source. When the capacitors are fully charged the contacts 50 are open and the contacts 46 are closed discharging the capacitors 48 through the primary of the transformer 44. This induces an electrical current in the second area of the transformer which is passed between the electrodes 40.

The weld voltage typically varies between 2 and 4 volts and the weld current will be more than about 50,000 amperes and preferably will be in the range of 60,000 to 80,000 amperes. The weld time must be less than about 30 microseconds and will typically be from 6 to 9 microseconds. The welding circuit illustrated is a simplified version of a conventional capacitor discharge circuit, and it should be understood that any type of welder circuit which can apply an extremely short duration, high current pulse could be used with the present invention.

When the the cylinders 42 are actuated the electrodes 40 exert pressure on the nut and sheath in excess of 1000 p.s.i. forcing diametrically opposed cap sections 26 into contact with the wrench flat ridges 17. The welding current is applied to the electrodes 40 while they are exerting pressure on the cap section faces. At relatively low current, the path through the cap alone would be of lower resistance than the path through the nut, due to the interface between the ridges and the cap. At large current levels and with high pressure contact however, the resistance at the point of contact is broken down allowing current to flow through the nut, entering and leaving via the ridges. Any rust-resistance coating on the nut body is also broken down by the initial current surge. The high density of current flow through the small area of the ridge/cap interfaces results in a large conversion of electric power to heat. A certain amount of "smearing", that is deformation and flattening of the ridges due to the heat and pressure of welding will take place, increasing the area of the bond between the cap and the nut.

Heating occurs principally at the interface mentioned. The weld time is so short that the cap does not oxidize and the heating action does not cause the carbon in the stainless steel to migrate to the grain boundaries to lower its corrosion resistance. The heat applied to the nut is not sufficient to affect its hardness.

The embodiments of the invention in which an exclusive property or privilege is claimed are defined as follows:

1. The method of forming a capped nut having a nut body with a central threaded aperture and polygonal sides, and a sheet metal cap adapted to at least partially surround the sides, comprising:
   bringing a pair of electrodes into pressured contact with opposed sides of the cap to impose opposed forces between the cap and the nut body,
   and passing a high current electrical pulse between the electrodes to cause a primary current flow through the contacting areas between the cap the the nut body adjacent the electrodes and through the nut body to cause welding of the cap to the nut body at the areas adjacent the electrodes.

2. The method of claim 1 wherein the electrodes contact the cap at areas overlying opposed polygonal faces of the nut body.

3. The method of claim 2 wherein the polygonal faces of the nut body are formed with protuberances which abut the inner surfaces of the cap to form areas of pressure concentration with the abutting cap surfaces when the electrodes are pressed against the outer surfaces of the cap, whereby the welds are formed at the contact areas between the protuberances and the cap.

4. The method of claim 3 wherein the protuberances comprise generally axially extending ridges formed on the polygonal flats.

5. The method of claim 1 wherein the current flow exceeds 50,000 amperes and lasts for less than 30 microseconds.

6. The method of claim 1 wherein the nut body is formed of carbon steel and the cap is formed of stainless steel.

7. The method of claim 1 wherein the nut is a wheel nut having a conical end and the cap covers the end of the nut opposite to the conical end in addition to at least a portion of the wrench flats.

8. The method of claim 1 wherein the surfaces of the nut body are coated with a corrosion-resistant material and the high current electrical pulse breaks down the resistance of this material between contacting areas of the cap and the nut body adjacent the electrodes.

9. The method of welding a sheet metal sheath to a nut body at least partially covered by the sheath, to form a capped wheel nut comprising:
   bringing a pair of electrodes into contact with spaced points on the outer surface of the sheath which overlies sections of the nut body and passing a short duration, high current pulse between the electrodes to cause a breakdown of the electrical resistance of the interfaces between the inner surface of the sheath and the contacted areas of the nut body, adjacent the electrodes, to provide a primary current path through these interfaces and the nut body between them resulting in welding of the sheath to the nut body at these interfaces.

10. The method in claim 9 wherein the electrodes contact areas of the sheath overlying diametrically opposed wrench flats of the nut body and the wrench flats are formed with outwardly extending projections to produce pressure concentrations between the sheath and the nut body at these projections, so that the welding occurs at the projections.

11. The method of claim 10 wherein the nut body is coated with a corrosion-resistant material and the welding current pulse breaks down the resistance of the coating at the contacting areas of the projections and the sheath.

12. The method of claim 10 wherein the pressure concentrations between the projections and the sheath, produced by the forces applied to the sheath by the electrodes, exceed 1,000 pounds per square inch.

13. The method of claim 12 wherein the weld current has a duration of less than 30 microseconds.

14. The method of claim 13 wherein the weld current exceeds about 50,000 amperes.

15. A method of forming a capped nut having a carbon steel nut body with a central threaded aperture and polygonal sides, and a stainless steel sheet metal cap adapted to at least partially surround the sides, comprising:
   bringing a pair of electrodes into pressured contact only with the opposed polygonal sides of the cap to impose opposed forces between the cap and the nut body,
   and creating primary current flow through the contacting areas between the cap and the nut body adjacent the electrodes and through the nut body to cause welding of the cap to the nut body at the areas adjacent the electrodes by the exclusive step of passing a high current electrical pulse of short duration between the electrodes.

16. The method of claim 15 wherein the polygonal faces of the nut body are formed with protuberances which abut the inner surface of the cap to form areas of pressure concentration with the abutting cap surfaces when the electrodes are pressed against the outer surfaces of the cap, whereby the welds are formed at the contact areas between the protuberances and the cap.

17. The method of claim 16 wherein the protuberances comprise generally axially extending ridges formed on the polygonal flats.

18. The method of claim 15 wherein the current flow exceeds 50,000 amperes and lasts for less than 30 microseconds.

19. The method of claim 15 wherein the surfaces of the nut body are coated with a corrosion-resistant material and the high current electrical pulse breaks down the resistance of this material between contacting areas of the cap and the nut body adjacent the electrodes.

20. The method of welding a stainless steel metal sheath to a carbon steel nut body with polygonal sides at least partially covered by the sheath, to form a capped wheel nut comprising:
   bringing a pair of electrodes into pressure contact only with diametrically opposed spaced points on the outer surface of the sheath which overlies the polygonal sides of the nut body and passing a short duration, high current pulse between the electrodes to cause a breakdown of the electrical resistance of the interfaces between the inner surface of the sheath and the contacted areas of the nut body, adjacent the electrodes, to provide a primary current path through these interfaces and the nut body between them resulting in welding of the sheath to the nut body at these interfaces without requiring additional apparatus for displacing current through the nut body.

21. The method of claim 20 wherein the polygonal sides are formed with outwardly extending projections to produce pressure concentrations between the sheath and the nut body at these projections, so that the welding occurs at the projections.

22. The method of claim 21 wherein the nut body is coated with a corrosion-resistant material and the welding current pulse breaks down the resistance of the coating at the contacting areas of the projections and the sheath.

23. The method of claim 21 wherein the pressure concentrations between the projections and the sheath, produced by the forces applied to the sheath by the electrodes, exceed 1,000 pounds per square inch.

24. The method of claim 20 wherein the weld current has a duration of less than 30 microseconds.

25. The method of claim 24 wherein the weld current exceeds about 50,000 amperes.

* * * * *